United States Patent
Yamaguchi

(10) Patent No.: US 6,807,819 B2
(45) Date of Patent: Oct. 26, 2004

(54) VAPOR COMPRESSION REFRIGERANT CYCLE

(75) Inventor: Motohiro Yamaguchi, Hoi-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/611,184

(22) Filed: Jul. 1, 2003

(65) Prior Publication Data

US 2004/0003615 A1 Jan. 8, 2004

(30) Foreign Application Priority Data

Jul. 1, 2002 (JP) ......................................... 2002-192201

(51) Int. Cl.[7] ............................. F25B 49/02; F25B 1/06
(52) U.S. Cl. ...................... 62/228.4; 62/228.3; 62/500; 62/229
(58) Field of Search ........................... 60/228.4, 228.1, 60/228.3, 228.5, 229, 215, 160, 226, 227, 208, 209, 500, 191, 116

(56) References Cited

U.S. PATENT DOCUMENTS

| | | | |
|---|---|---|---|
| 4,622,827 A | * 11/1986 | Jabami et al. | ................ 62/158 |
| 5,323,619 A | * 6/1994 | Kim | ............................. 62/160 |
| 6,134,901 A | * 10/2000 | Harvest et al. | ............ 62/228.4 |
| 6,508,072 B1 | * 1/2003 | Kanazawa et al. | ......... 62/228.4 |

FOREIGN PATENT DOCUMENTS

| | | |
|---|---|---|
| JP | 1-107056 | 4/1989 |
| JP | 2902061 B2 | 3/1999 |
| JP | 2000-205671 | 7/2000 |

* cited by examiner

*Primary Examiner*—Harry B. Tanner
(74) *Attorney, Agent, or Firm*—Harness, Dickey & Pierce, PLC

(57) ABSTRACT

In a vapor compression refrigerant cycle for an air conditioner, as a refrigerant pressure at an operation starting time of a compressor increases, a starting target rotational speed of the compressor is reduced, and the operation of the compressor is started by the reduced starting target rotational speed. Accordingly, when the operation of the compressor is started, it can prevent the pressure of high-pressure side refrigerant from exceeding an allowable pressure of the compressor, thereby preventing a safety device of the compressor from operating. Therefore, even when the operation of the compressor is started in a high load state, a pressure abnormality is not generated in the refrigerant cycle, and operation of the air conditioner can be prevented from being stopped.

15 Claims, 8 Drawing Sheets

VAPOR COMPRESSION REFRIGERANT CYCLE

CROSS-REFERENCE TO RELATED APPLICATION

This application is related to and claims priority from Japanese Patent Application No. 2002-192201 filed on Jul. 1, 2002, the content of which is hereby incorporated by reference.

BACKGROUND OF THE INVENTION

1. Field of the Invention

The present invention relates to a vapor compression refrigerant cycle for transferring heat from a low-temperature side to a high-temperature side. More particularly, the present invention relates to a rotational speed control of a compressor in the vapor compression refrigerant cycle at an operation starting time of the compressor. The vapor compression refrigerant cycle is suitably used for an air conditioner.

2. Description of Related Art

For example, in JP-B-2902061, a capacity of a vapor compression refrigerant cycle is controlled by controlling a rotational speed of a compressor to a target value that is determined based on a set temperature, a room air temperature and an outside air temperature. In this vapor compression refrigerant cycle, when a fixed throttle having a fixed open degree is used as a decompression device, the following problem is caused. For example, if the room air temperature and the outside air temperature are high, an air-conditioning load of the vapor compression refrigerant cycle (air conditioner), that is, a cooling load thereof is large, so a large cooling capacity is required. Therefore, a control unit for controlling the compressor sets a target rotational speed of the compressor at a high value, and controls the compressor by the set target rotational speed.

Accordingly, in a case where the cooling load of the air conditioner is large such as in the summer, when the compressor of the air conditioner is operated, the target rotational speed is set at the high value. Further, at this time, refrigerant pressure in the vapor compression refrigerant cycle has already increased before an operation start of the compressor. As a result, refrigerant pressure at a high pressure side in the vapor compression refrigerant cycle may exceed its allowable pressure. Furthermore, if the fixed throttle is adopted as the decompression device, the refrigerant pressure at the high pressure side increases approximately in proportional to the square of the rotational speed of the compressor. As a result, the refrigerant pressure at the high pressure side may exceed the allowable pressure when the operation of the compressor is started. If the refrigerant pressure at the high pressure side exceeds the allowable pressure, a safety device of the compressor operates. Therefore, the operation of the compressor is stopped, and the operation of the vapor compression refrigerant cycle for the air conditioner is stopped.

SUMMARY OF THE INVENTION

In view of the above-described problems, it is an object of the present invention to provide a vapor compression refrigerant cycle capable of preventing pressure abnormality from being generated when operation of a compressor is started in a large cooling load.

According to an aspect of the present invention, a vapor compression refrigerant cycle includes a compressor for compressing and discharging refrigerant, a high-pressure heat exchanger for radiating heat of high-pressure refrigerant discharged from the compressor, a decompression device that decompresses the high-pressure refrigerant from the high-pressure heat exchanger, a low-pressure heat exchanger for evaporating low-pressure refrigerant after being decompressed in the decompression device, and a control unit for controlling a rotational speed of the compressor. In the vapor compression refrigerant cycle, the control unit sets a starting target rotational speed of the compressor at an operation starting time of the compressor based on a refrigerant pressure of the compressor at the operation starting time such that the starting target rotational speed is reduced as the refrigerant pressure increases, and the control unit starts the compressor by the starting target rotational speed. Accordingly, when the operation of the compressor is started, pressure of the high-pressure refrigerant can be prevented from exceeding an allowable pressure in the vapor compression refrigerant cycle. Therefore, when the operation of the compressor is started in a high load state, it can prevent a pressure abnormality from being generated in the refrigerant cycle.

Alternatively, the control unit sets the starting target rotational speed of the compressor based on at least one of an air temperature around the high-pressure heat exchanger and an air temperature around the low-pressure heat exchanger such that the starting target rotational speed is reduced as at least one of the air temperatures increases, and the control unit starts operation of the compressor by the starting target rotational speed. Generally, as the air temperatures become higher, the refrigerant pressure at the operation starting time of the compressor is increased. Accordingly, by reducing the starting target rotational speed as at least one of the air temperatures increases, it can prevent the pressure abnormality from being generated in the refrigerant cycle.

Further, in the present invention, as the decompression device, an ejector including a nozzle or a variable throttle can be used.

According to another aspect of the present invention, the control unit calculates a starting target rotational speed of the compressor at the operation starting time of the compressor based on one of the refrigerant pressure in the compressor, an air temperature in a compartment and an air temperature around the high-pressure heat exchanger such that the starting target rotational speed is reduced as the one of the refrigerant pressure and the air temperatures increases. Further, the control unit calculates a general target rotational speed based on a target temperature of air to be blown into the compartment. In addition, the control unit has determining means that determines a smaller one among the starting target rotational speed and the general target rotational speed, as a determined target rotational speed at the operation starting time. In this case, the control unit starts operation of the compressor by the determined target rotational speed. Accordingly, it can effectively prevent the pressure abnormality from being generated in the refrigerant cycle.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the appended drawings.

(First Embodiment)

Figure 1:
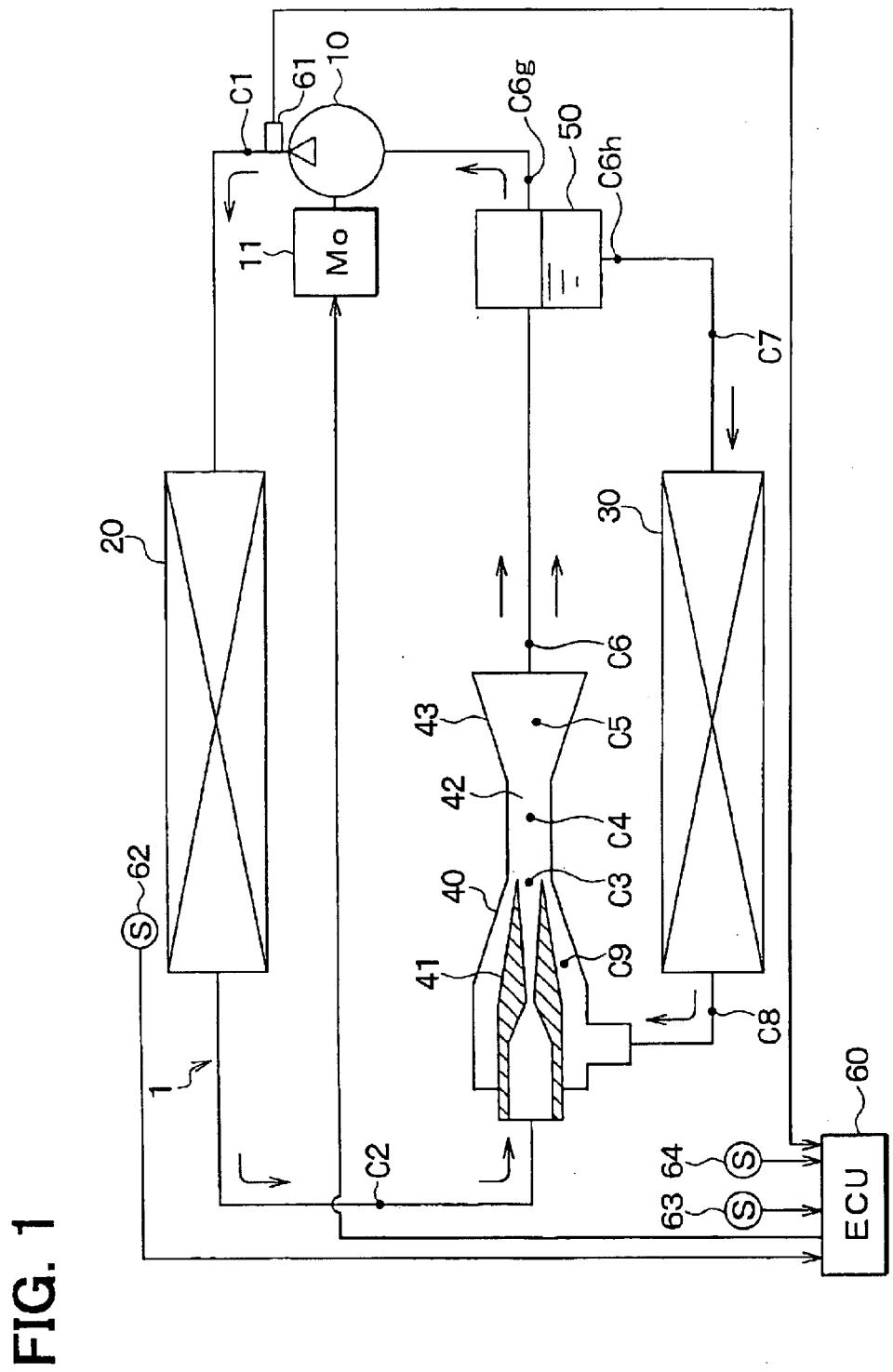
FIG. 1 is a schematic diagram showing an ejector cycle (vapor compression refrigerant cycle) according to a first embodiment of the present invention.

In the first embodiment, a vapor compression refrigerant cycle according to the present invention is typically used for a vehicle air conditioner. As shown in FIG. 1, in the first embodiment, the vapor compression refrigerant cycle is an ejector cycle 1 including an ejector 40 that is used as a decompression device. A compressor 10 is a fixed displacement compressor for sucking and compressing refrigerant by using motive power from an electric motor 11. A radiator 20 is a high-pressure side heat exchanger for cooling refrigerant discharged from the compressor 10 by performing heat-exchange operation between the discharged refrigerant and outside air. In FIG. 1, the compressor 10 and the electric motor 11 are indicated as separation parts that are separated from each other. However, the compressor 10 and the electric motor 11 can be integrated together to form an electric compressor. An evaporator 30 is a low-pressure side heat exchanger for cooling air to be blown into a passenger compartment by performing heat exchange operation between the air and liquid refrigerant.

The ejector 40 increases pressure of refrigerant to be sucked into the compressor 10 by converting expansion energy to pressure energy, and sucks refrigerant evaporated in the evaporator 30 by decompressing and expanding refrigerant from the radiator 20. The ejector 40 includes a nozzle 41, a mixing portion 42, a diffuser 43 and the like. The nozzle 41 decompresses and expands refrigerant flowing into the ejector 40, so as to convert pressure energy of the refrigerant from the radiator 20 to speed energy thereof. The mixing portion 42 sucks refrigerant evaporated in the evaporator 30 by using a high-speed stream of refrigerant injected from the nozzle 41, and mixes the sucked refrigerant from the evaporator 30 and the injected refrigerant from the nozzle 41. The diffuser 43 increase pressure of refrigerant to be sucked into the compressor 10 by converting the speed energy of the refrigerant to the pressure energy thereof while mixing the sucked refrigerant and the injected refrigerant.

Here, the nozzle 41 is a fixed throttle having a fixed open degree. Therefore, the nozzle 41 decompresses and expands high-pressure refrigerant substantially in isentropic. At this time, the mixing portion 42 mixes the drive stream of the injected refrigerant and the suction stream of the suction refrigerant so as to conserve the momentum sum of the drive stream and the suction stream. Therefore, in the mixing portion 42 of the ejector 40, refrigerant pressure (static pressure) is also increased. On the other hand, the diffuser 43 has a passage cross-sectional area that is gradually increased toward downstream. Therefore, the diffuser 43 converts the refrigerant speed energy (dynamic pressure) to the refrigerant pressure energy (static energy). Therefore, in the ejector 40, because both of the mixing portion 42 and the diffuser 43 increase refrigerant pressure, a pressure-increasing portion is constructed with the mixing portion 42 and the diffuser 43. In the first embodiment, the Laval nozzle is used for accelerating refrigerant injected from the nozzle 41 to be equal to or higher than the sound velocity. Here, "the Laval nozzle (refer to Fluid Engineering published by Tokyo University Publication)" includes a throttle 41a having the smallest passage area in its refrigerant passage.

Figure 2:
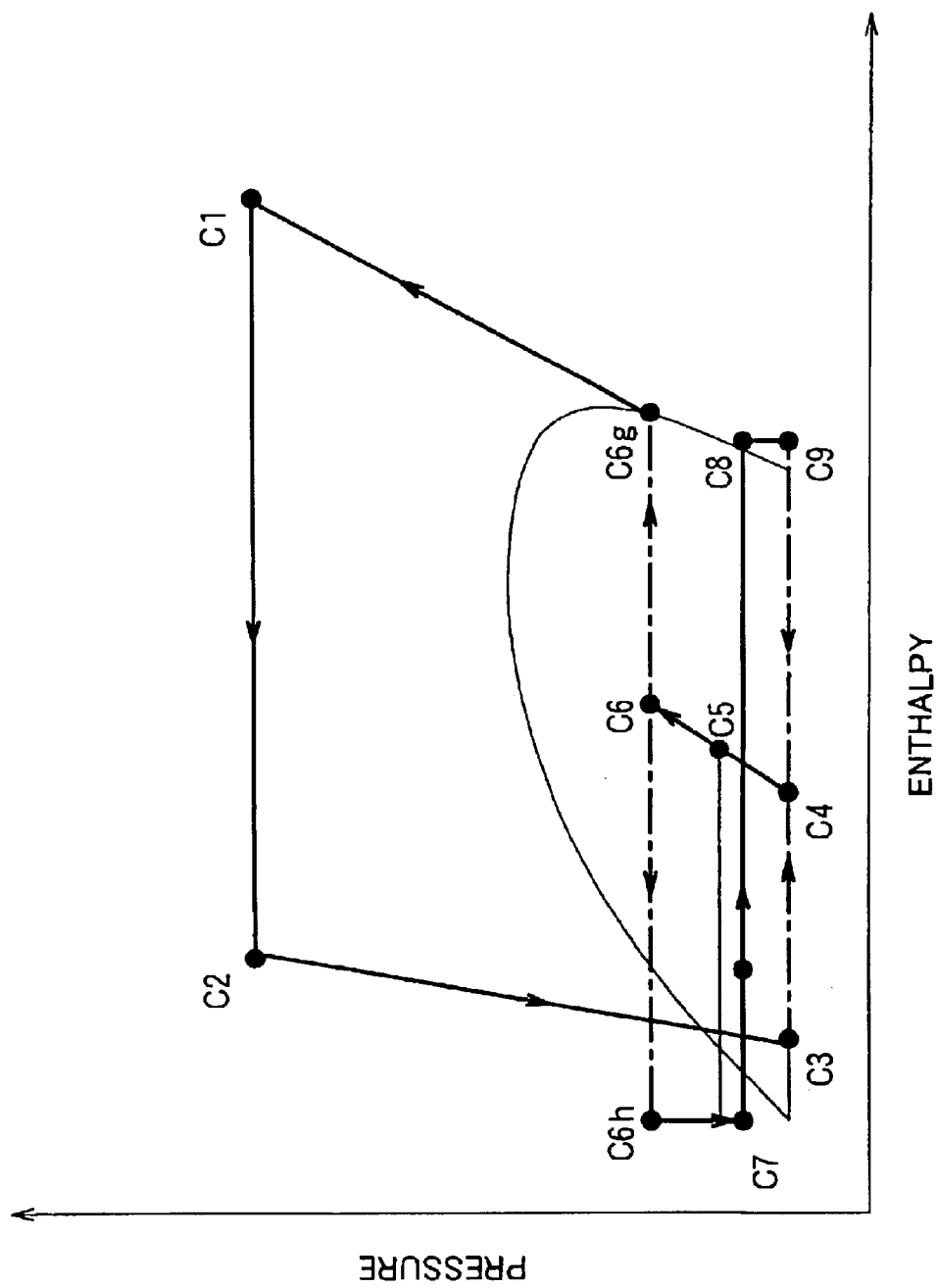
FIG. 2 is a Mollier diagram (p-h diagram) showing a relationship between a refrigerant pressure and an enthalpy in the ejector cycle according to the first embodiment.

A gas-liquid separator 50 separates refrigerant flowing out from the ejector 40 into gas refrigerant and liquid refrigerant, and stores therein the separated liquid refrigerant. A gas refrigerant outlet of the gas-liquid separator 50 is connected to a suction side of the compressor 10, and a liquid refrigerant outlet thereof is connected to a refrigerant inlet side of the evaporator 30. A refrigerant passage, for connecting the liquid refrigerant outlet of the gas-liquid separator 50 and the evaporator 30, is provided so as to generate a predetermined pressure loss. In the first embodiment, as shown in FIG. 2, high-pressure side refrigerant before being decompressed flows into the nozzle 41, and the pressure of the high-pressure side refrigerant from the compressor 10 is increased higher than critical pressure of refrigerant. For example, in the first embodiment, carbon dioxide is used as the refrigerant. Further, reference numerals C1–C9 shown in FIG. 2 indicate refrigerant states at positions indicated by reference numerals C1–C9 shown in FIG. 1, respectively.

In FIG. 1, a pressure sensor 61 is disposed at the discharge side of the compressor 10, and detects the pressure of refrigerant discharged from the compressor 10 in the ejector cycle 1. An outside temperature sensor 62 is disposed around the radiator 20, and detects an outside air temperature TAM. An inside temperature sensor 63 is disposed in the passenger compartment, and detects an inside air temperature TR in the passenger compartment. A solar sensor 64 detects a solar radiation amount radiated into the passenger compartment. Detection signals from the sensors 61–64 are input to an electronic control unit (ECU) 60, and the ECU 60 controls a rotational speed of the compressor 10, that is, the motor 11, based on the detection signals of the sensors 61–64.

Next, operation of the ejector cycle 1 will be now described with reference to FIG. 2. High-pressure side refrigerant discharged from the compressor 10 is circulated to the radiator 20, and is cooled by the radiator 20. The cooled refrigerant is decompressed and expanded by the nozzle 41 of the ejector 40 in isentropic, and flows into the mixing portion 42 by a speed equal to or higher than the sound velocity. Further, the refrigerant evaporated in the evaporator 30 is sucked into the mixing portion 42 by a pumping function due to the high-speed refrigerant flowing into the mixing portion 42. Thus, the low-pressure refrigerant is circulated from the gas-liquid separator 50 to the gas-liquid separator 50 through the evaporator 30 and the pressure-increasing portion of the ejector 40 in this order.

On the other hand, the refrigerant (suction stream) sucked from the evaporator 30 and the refrigerant (drive stream) injected from the nozzle 41 are mixed together in the mixing portion 42. At this time, the dynamic pressure of the mixed refrigerant is converted to the static pressure thereof, and the mixed refrigerant is returned to the gas-liquid separator 50.

Figure 3:
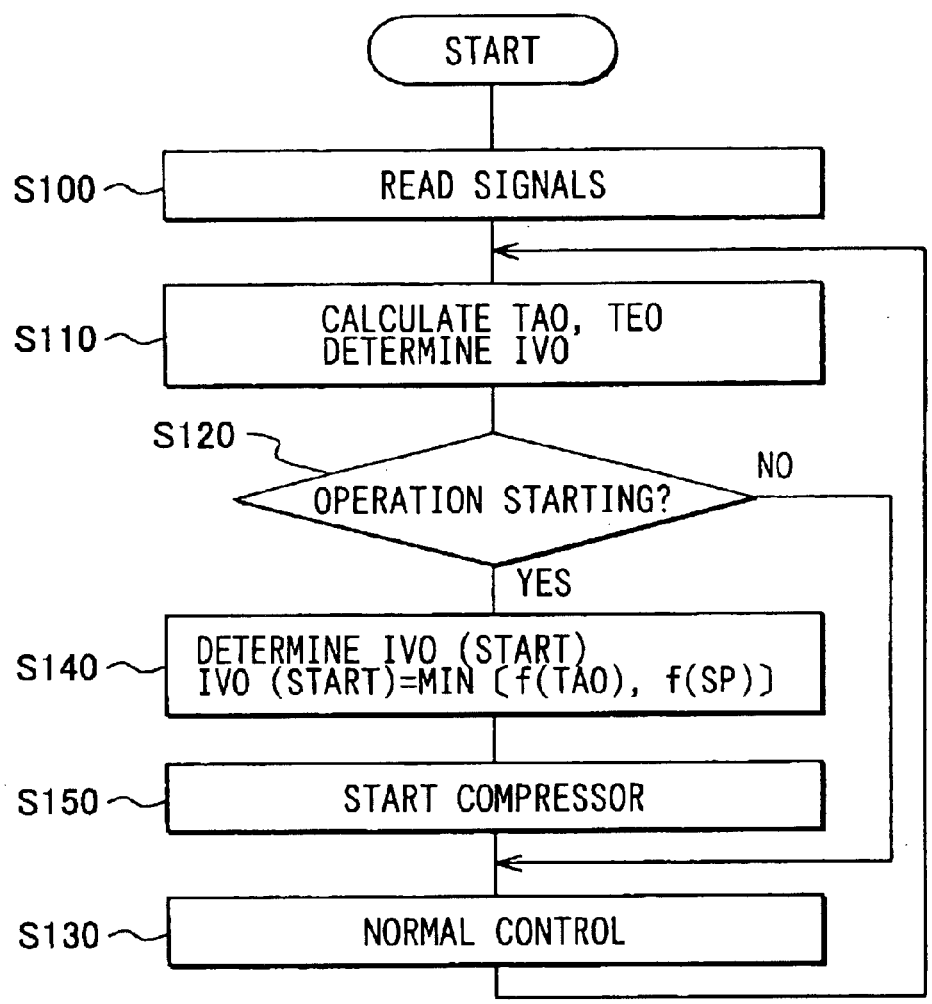
FIG. 3 is a flow diagram showing a control process of the ejector cycle according to the first embodiment.

Next, control operation of the ejector cycle 1 (vapor compression refrigerant cycle) according to the first embodiment will be described. The control process shown in FIG. 3 is performed when a start switch (A/C switch) of the vapor compression refrigerant cycle 1, that is, a start switch of the compressor 10 is turned on. Then, at step S100, the detection values of the sensors 61–64 are input to the ECU 60. At step S110, a target blow temperature TAO (i.e., target air temperature to be blown into the passenger compartment) is calculated by the formula (1) based on the input detection values, and a target evaporator temperature TEO (e.g., target air temperature in the evaporator 30) is calculated based on the target blow temperature TAO.

$$TAO = KSET \times TSET - KR \times TR - KAM \times TAM - KS \times TS - C1 \quad (1)$$

wherein, the KSET, KR, KAM and KS are gains, the C1 is a constant, The TSET is a set temperature of the passenger compartment by a passenger, the TR is an inside air temperature, the TAM is an outside air temperature, and the TS is a detection value of the solar sensor 64.

Figure 4:
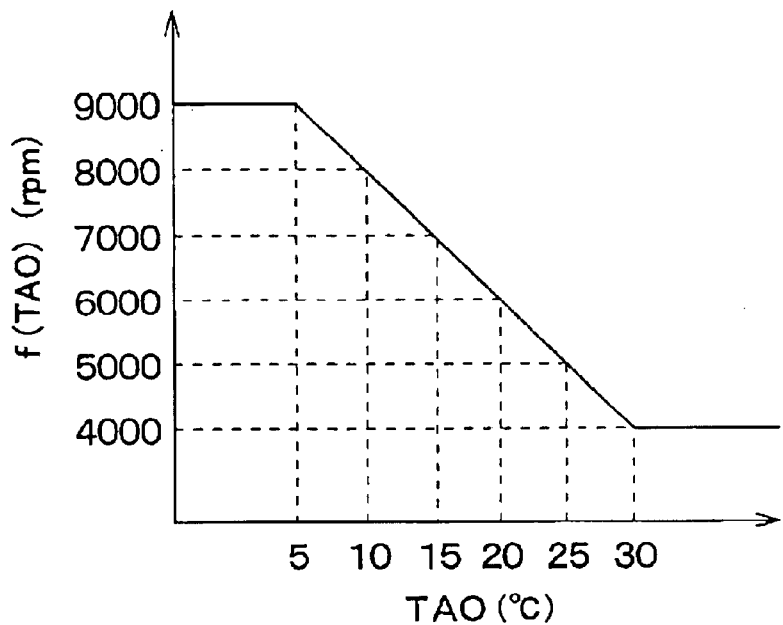
FIG. 4 is a graph showing a relationship between a target rotational speed IVO (f(TAO)) of a compressor and a target blow temperature TAO of air according to the first embodiment.

Then, at step S110, a target rotational speed IVO (general target rotational speed) of the compressor 10 is determined based on the graph shown in FIG. 4. In FIG. 4, because the target rotational speed IVO of the compressor 10 is determined based on the target blow temperature TAO, the general target rotational speed IVO is indicated by f(TAO). A relationship between the target blow temperature TAO and the general target rotational speed IVO (f(TAO)) is shown in FIG. 4.

At step S120, it is determined whether or not the operation of the compressor 10 is starting. When it is determined at step S120 that the operation of the compressor 10 is not at a starting time, that is, when it is determined that the operation has been already started, the control process moves to step S130. Then, at step S130, a drive current to be supplied to the compressor 10 is controlled based on the general target rotational speed IVO so as to normally control the compressor 10. That is, at step S130, the drive current to be supplied to the compressor 10 is controlled so that the rotational speed of the compressor 10 becomes the general target rotational speed IVO. When it is determined at step S120 that the operation is in the starting time, the control process moves to steps S140, S150. Then, at steps S140, S150, the operation of the compressor 10 is started by a target rotational speed that is set by a smaller rotational speed among the general target rotational speed IVO and a starting target rotational speed f(SP). Specifically, at step S140, the general target rotational speed IVO (F(TAO)) and the starting target rotational speed f(SP) are compared, and the smaller one among which is used as the target rotational speed IVO (START) at an operation starting time.

Figure 5:
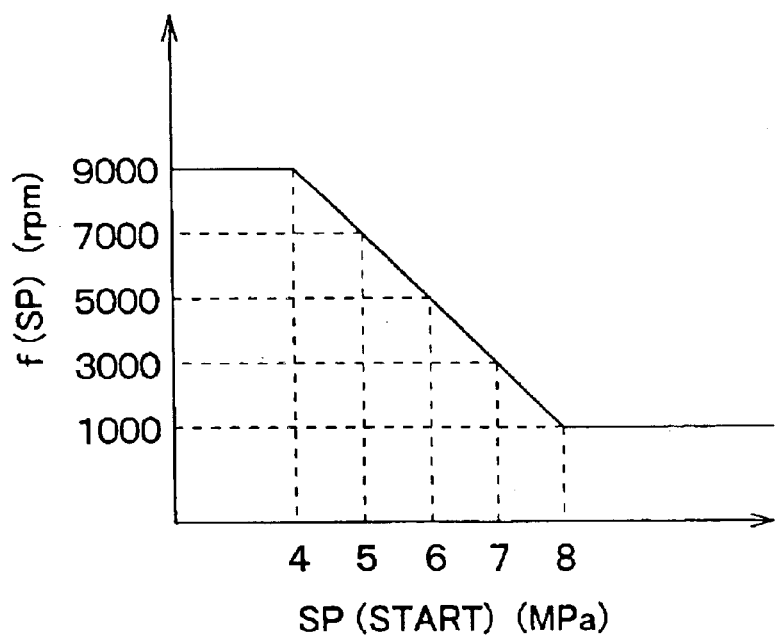
FIG. 5 is a graph showing a relationship between a refrigerant pressure SP(START) and a starting target rotational speed f(SP) of the compressor according to the first embodiment.

Here, the starting target rotational speed f(SP) is determined based on a refrigerant pressure SP(START) at the operation starting time of the compressor 10, detected by the pressure sensor 61. As shown in FIG. 5, as the refrigerant pressure SP(START) increases, the starting target rotational speed f(SP) is reduced. In the first embodiment, a lower limit of the starting target rotational speed f(SP) is set at 1000 rpm (i.e., rotation per minute), and an upper limit thereof is set at 9000 rpm. Generally, the general target rotational speed IVO (f(TAO)) is higher than the starting target rotational speed f(SP) in a high load state. Therefore, when the operation of the compressor 10 is started in the high load state, the operation of the compressor 10 is started by the starting target rotational speed f(SP).

Next, operational effects of the first embodiment will be described. According to the first embodiment, as the refrigerant pressure at the operation starting time of the compressor 10 increases, the starting target rotational speed f(SP) is reduced, and the operation of the compressor 10 is started by the reduced starting target rotational speed f(SP). Therefore, when the operation of the compressor 10 is started, the pressure of the high-pressure side refrigerant can be prevented from exceeding the allowable pressure (permissible pressure) of the vapor compression refrigerant cycle 1, and pressure abnormality caused at the operation starting time of the compressor 10 can be prevented. Further, at this time, since the safety device of the compressor 100 can be prevented from operating, the operation of the compressor 10 can be prevented from being stopped even when the compressor 10 starts from a high-load state.

Figure 6A:
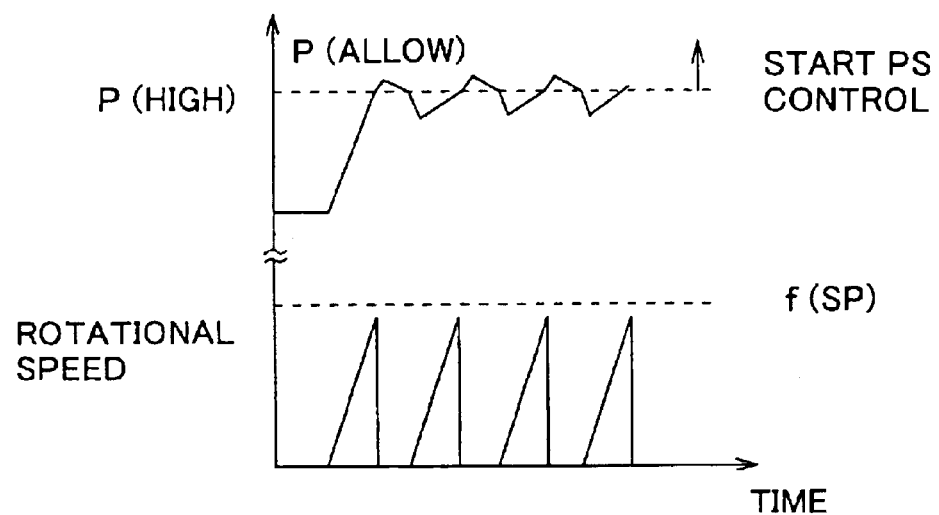
FIG. 6A is a graph showing a relationship between a refrigerant pressure P(HIGH) at a high-pressure side in a refrigerant cycle, a rotational speed of a compressor and a passed time after starting the compressor in a related art.
Figure 6B:
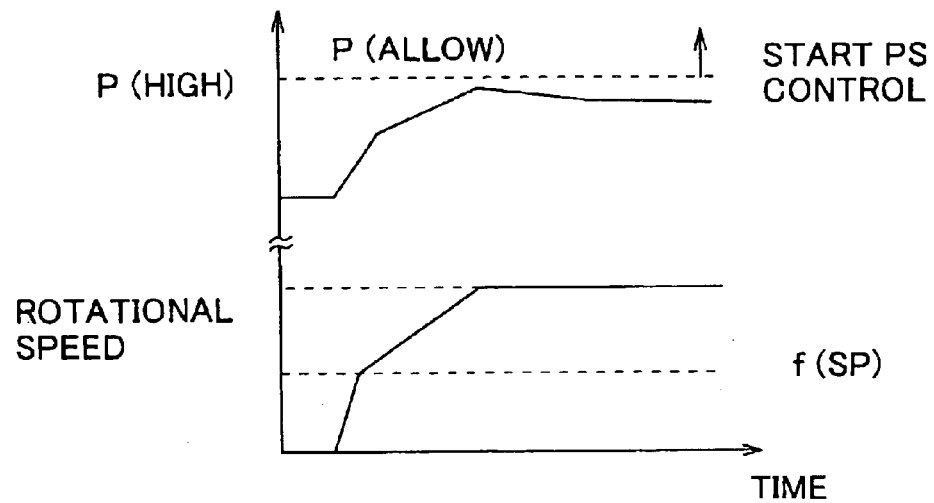
FIG. 6B is a graph showing a relationship between the refrigerant pressure P(HIGH) at the high-pressure side in the vapor-compression refrigerant cycle, the rotational speed of the compressor and the passed time in the first embodiment.

According to the experiments performed by the present inventor, balanced refrigerant pressure of the vapor compression refrigerant cycle 1 increases to about 8–9 million pascals (MPa) in the high-load stoppage state before the start of the compressor 10. In this condition, if the operation of the compressor 10 is started while the compressor 10 is controlled by the general target rotational speed IVO (f(TAO)), the safety device of the compressor 10 generally operates, thereby stopping the operation of the vapor compression refrigerant cycle 1 (air conditioner). As shown in FIG. 6A, in the related art, since the pressure P(HIGH) of the high-pressure side refrigerant at the operation starting time of the compressor 10 exceeds the allowable pressure P(ALLOW) by several times, pressure safety control (PS control) is started by several times. Therefore, the operation of the air conditioner is stopped. However, in the first embodiment of the present invention, as shown in FIG. 6B, the operation of the air conditioner can be started without being stopped even in a high load state.

(Second Embodiment)

In the above-described first embodiment, the operation of the compressor 10 is started by the target rotational speed that is set by the smaller one among the general target rotational speed IVO (f(TAO)) and the starting target rotational speed f(SP). However, in the second embodiment, the operation of the compressor 10 is started by a target rotational speed that is set by a smaller one among the general target rotational speed IVO (f(TAO)) and a starting target rotational speed f(TAM). In the first embodiment, the starting target rotational speed f(SP) is determined based on the refrigerant pressure SP(START) at the operation starting time of the compressor 10. In the second embodiment, the starting target rotational speed f(TAM) is determined based on the outside air temperature TAM at the operation starting time of the compressor 10.

Figure 7:
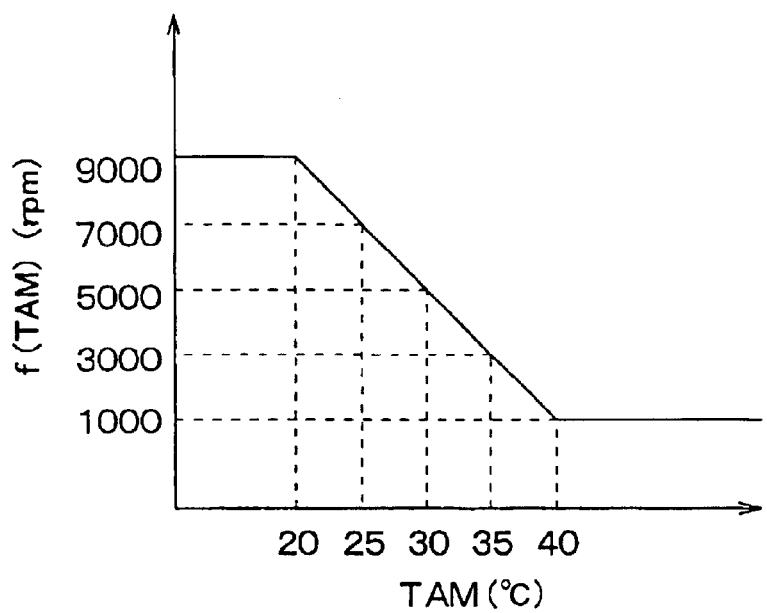
FIG. 7 is a graph showing a relationship between an outside air temperature TAM and a starting target rotational speed f(TAM) at a start time of the compressor according to a second embodiment of the present invention.

As shown in FIG. 7, as the outside air temperature TAM at the operation starting time of the compressor 10 increases, the starting target rotational speed f(TAM) is reduced. At this time, the refrigerant pressure SP(START) at the operation starting time of the compressor 10, that is, the balanced refrigerant pressure of the vapor compression refrigerant cycle 1 is increased. Therefore, in the second embodiment, the pressure of the high-pressure side refrigerant can be prevented from exceeding the allowable pressure when the operation of the compressor 10 is started. Further, even when the operation of the compressor 10 is started in the high load state, it can prevent the pressure abnormality from being generated when the compressor 10 starts from the high-load stoppage state. In the second embodiment, the other parts are similar to those of the above-described first embodiment.

(Third Embodiment)

In the above-described first embodiment, the operation of the compressor 10 is started by the target rotational speed that is set by the smaller one among the general target rotational speed IVO (f(TAO)) and the starting target rotational speed f(SP). However, in the third embodiment, the operation of the compressor 10 is started by a target rotational speed that is set by a smaller one among the general target rotational speed IVO and a starting target rotational speed f(TR). In the second embodiment, the starting target rotational speed f(TR) is determined based on the inside air temperature TR at the operation starting time of the compressor 10.

Figure 8:
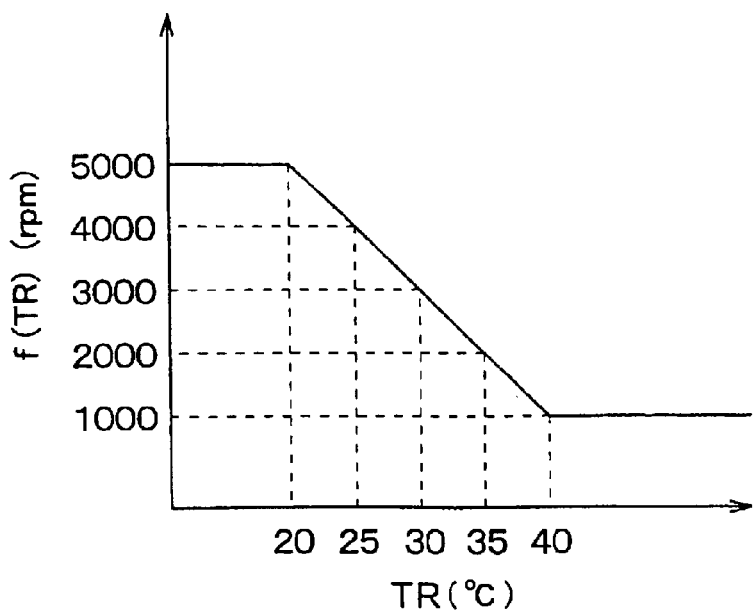
FIG. 8 is a graph showing a relationship between an inside air temperature TR and a starting target rotational speed f(TR) at a start time of the compressor according to a third embodiment of the present invention.

As shown in FIG. 8, as the inside air temperature TR at the operation starting time of the compressor 10 increases, the starting target rotational speed f(TR) is reduced. At this time, the refrigerant pressure SP(START) at the operation starting time of the compressor 10, that is, the balanced refrigerant pressure of the vapor compression refrigerant cycle 1 is increased. Therefore, in the third embodiment, the pressure of the high-pressure side refrigerant can be prevented from exceeding the allowable pressure when the operation of the compressor 10 is started. Further, when the operation of the compressor 10 is started in the high load state, the pressure abnormality can be prevented. In the third embodiment, the other parts are similar to those of the above-described first embodiment.

(Fourth Embodiment)

Figure 9:
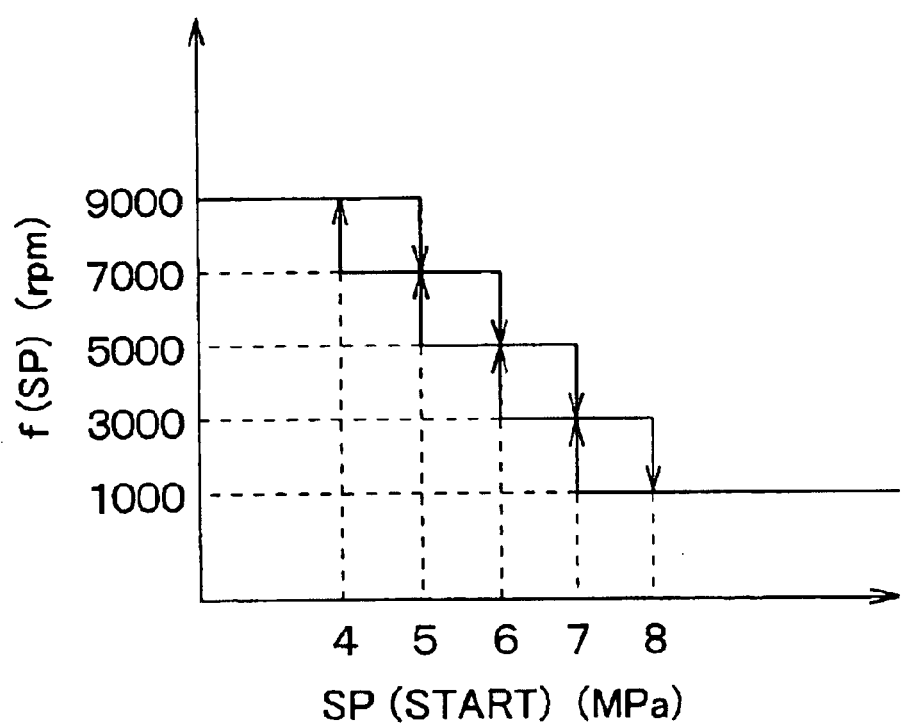
FIG. 9 is a graph showing a relationship between the refrigerant pressure SP (START) and a starting target rotational speed f(SP) at a start time of the compressor according to a fourth embodiment of the present invention.

In the above-described first embodiment, as the refrigerant pressure SP(START) at the operation starting time of the compressor 10 changes, the starting target rotational speed f(SP) is continuously changed. However, in the fourth embodiment, as shown in FIG. 9, as the refrigerant pressure SP(START) changes, the starting target rotational speed f(SP) is changed stepwise.

Further, in the first embodiment, as the refrigerant pressure SP(START) changes, the starting target rotational speed f(SP) is continuously and linearly changed. However, in the fourth embodiment, as shown in FIG. 9, a relationship between the refrigerant pressure SP(START) and the starting target rotational speed f(SP) has hysteresis. That is, the starting target rotational speed f(SP) is non-linearly changed. The fourth embodiment can be applied to the second and third embodiments. Specifically, the stating target rotational speed f(TAM) or the stating target rotational speed f(TR) can be changed with respect to the outside air temperature TAM or the inside air temperature TR, similarly to the graph in FIG. 9.

Although the present invention has been fully described in connection with the preferred embodiments thereof with reference to the accompanying drawings, it is to be noted that various changes and modifications will become apparent to those skilled in the art.

For example, the present invention can be applied to another use without being limited to the vehicle air conditioner in the above embodiments. Further, a decompression device, for decompressing refrigerant in isenthalpic, such as a fixed throttle and a capillary tube can be adopted without being limited to the ejector 40 in the above embodiments. In the above embodiments, carbon dioxide is used as the refrigerant, and discharge refrigerant pressure of the compressor 10 is set equal to or higher than critical pressure of refrigerant. However, the present invention is not limited to this manner. That is, the present invention can be applied to a vapor-compression refrigerant cycle where the pressure of the high-pressure side refrigerant is lower than the critical pressure of the refrigerant.

Figure 10:
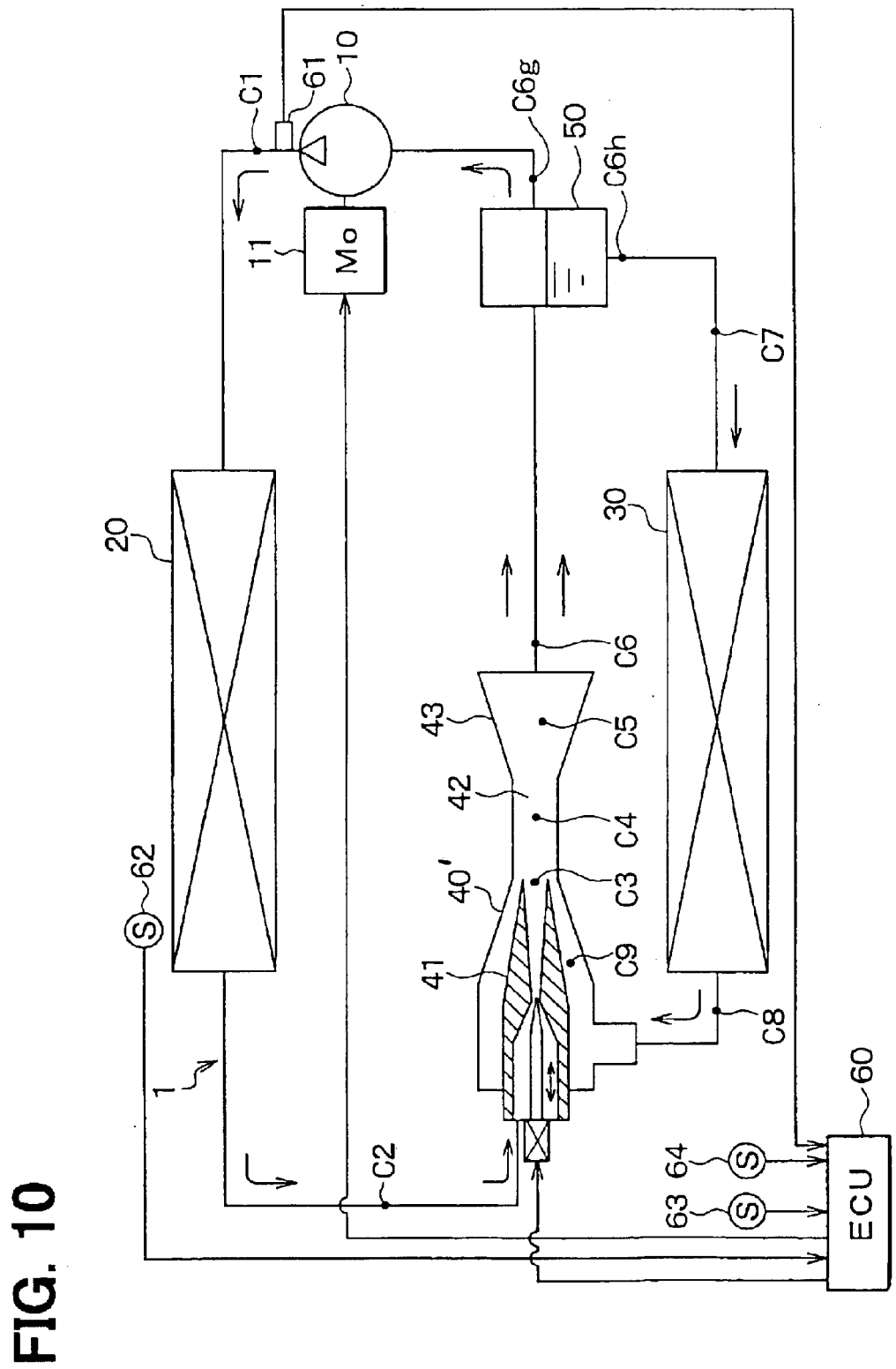
FIG. 10 is a schematic diagram showing an ejector cycle (vapor-compression refrigerant cycle) having a pressure control valve for controlling a throttle open degree of a nozzle of an ejector according to a modification of the present invention.

Further, as illustrated in FIG. 10, a pressure control valve 40' may be used as the decompression device. In this case, an open degree of the pressure control valve 40' is controlled based on a temperature of the high-pressure side refrigerant so as to increase the coefficient of performance of the vapor compression refrigerant cycle 1. The temperature of the high-pressure side refrigerant can be obtained by modifying pressure sensor 61 to include temperature sensing or by any other means of sensing the temperature of the high-pressure side refrigerant known in the art. Further, when the operation of the compressor 10 is started in the high load state, the open degree of the pressure control valve is controlled small, thereby readily increasing the pressure of the high-pressure refrigerant.

Further, the target rotational speed IVO(START) at the operation starting time of the compressor 10 can be determined by a smallest one among the general target rotational speed f(TAO), and the starting target rotational speeds f(SP), f(TAM) and f(TR). In addition, at the operation starting time of the compressor 10, the control unit 60 can control the compressor 10 by the one of the starting target rotational speeds f(SP), f(TAM) and f(TR), without the comparison with the general target rotational speed.

Such changes and modifications are to be understood as being within the scope of the present invention as defined by the appended claims.

What is claimed is:

1. A vapor compression refrigerant cycle comprising:
   a compressor for compressing and discharging refrigerant;
   a high-pressure heat exchanger for radiating heat of high-pressure refrigerant discharged from the compressor;
   a decompression device that decompresses the high-pressure refrigerant from the high-pressure heat exchanger;
   a low-pressure heat exchanger for evaporating low-pressure refrigerant after being decompressed in the decompression device; and
   a control unit for controlling a rotational speed of the compressor, wherein:
   the control unit sets a starting target rotational speed of the compressor at an operation starting time of the compressor based on a refrigerant pressure of the compressor at the operation starting time such that the starting target rotational speed is reduced as the refrigerant pressure increases; and
   the control unit starts the compressor by the starting target rotational speed.

2. The vapor compression refrigerant cycle according to claim 1, wherein:
   the decompression device is an ejector including a nozzle for decompressing and expanding refrigerant flowing from the high-pressure heat exchanger in isentropic; and the ejector is disposed to circulate the low-pressure refrigerant to the low-pressure heat exchanger by a jet flow of refrigerant injected from the nozzle.

3. The vapor compression refrigerant cycle according to claim 1, wherein the decompression device is a variable throttle having an opening degree that is controlled based on a temperature of the high pressure refrigerant.

4. The vapor compression refrigerant cycle according to claim 1, wherein the refrigerant discharged from the compressor has a pressure equal to or higher than critical pressure of the refrigerant.

5. The vapor compression refrigerant cycle according to claim 1, wherein the refrigerant is carbon dioxide.

6. A vapor compression refrigerant cycle comprising:
a compressor for compressing and discharging refrigerant;
a high-pressure heat exchanger for radiating heat of high-pressure refrigerant discharged from the compressor;
a decompression device that decompresses the high-pressure refrigerant from the high-pressure heat exchanger;
a low-pressure heat exchanger for evaporating low-pressure refrigerant after being decompressed in the decompression device; and
a control unit for controlling a rotational speed of the compressor, wherein:
the control unit sets a starting target rotational speed of the compressor at an operation starting time of the compressor based on at least one of an air temperature around the high-pressure heat exchanger and an air temperature around the low-pressure heat exchanger such that the starting target rotational speed is reduced as at least one of the air temperatures increases; and
the control unit starts operation of the compressor by the starting target rotational speed.

7. The vapor compression refrigerant cycle according to claim 6, wherein:
the low-pressure heat exchanger is disposed in a compartment to perform heat exchange with inside air inside the compartment; and
the high-pressure heat exchanger is disposed outside the compartment to perform heat exchange with an outside air of the compartment; and
the control unit sets the starting target rotational speed to be smaller as the temperature of the outside air becomes higher.

8. The vapor compression refrigerant cycle according to claim 6, wherein:
the low-pressure heat exchanger is disposed in a compartment to perform heat exchange with inside air inside the compartment; and
the high-pressure heat exchanger is disposed outside the compartment to perform heat exchange with an outside air of the compartment; and
the control unit sets the starting target rotational speed to be smaller as temperature of the inside air becomes higher.

9. The vapor compression refrigerant cycle according to claim 6, wherein:
the decompression device is an ejector including a nozzle for decompressing and expanding refrigerant flowing from the high-pressure heat exchanger in isentropic; and the ejector is disposed to circulate the low-pressure refrigerant to the low-pressure heat exchanger by a jet flow of refrigerant injected from the nozzle.

10. The vapor compression refrigerant cycle according to claim 6, wherein the decompression device is a variable throttle having an opening degree that is controlled based on a temperature of the high pressure refrigerant.

11. The vapor compression refrigerant cycle according to claim 6, wherein the refrigerant discharged from the compressor has a pressure equal to or higher than critical pressure of the refrigerant.

12. A vapor compression refrigerant cycle comprising:
a compressor for compressing and discharging refrigerant;
a high-pressure heat exchanger disposed for radiating heat of high-pressure refrigerant discharged from the compressor;
a decompression device that decompresses the high-pressure refrigerant from the high-pressure heat exchanger;
a low-pressure heat exchanger disposed for performing heat exchange between air to be blown into a compartment and low-pressure refrigerant after being decompressed in the decompression device; and
a control unit for controlling a rotational speed of the compressor, wherein:
the control unit calculates a starting target rotational speed of the compressor at an operation starting time of the compressor based on one of a refrigerant pressure in the compressor, an air temperature in the compartment and an air temperature around the high-pressure heat exchanger such that the starting target rotational speed is reduced as the one of the refrigerant pressure and the air temperatures increases;
the control unit calculates a general target rotational speed based on a target temperature of air to be blown into the compartment;
the control unit has determining means that determines a smaller one among the starting target rotational speed and the general target rotational speed, as a determined target rotational speed at the operation starting time; and
the control unit starts operation of the compressor by the determined target rotational speed.

13. The vapor compression refrigerant cycle according to claim 12, wherein:
the decompression device is an ejector including a nozzle for decompressing and expanding refrigerant flowing from the high-pressure heat exchanger in isentropic; and
the ejector is disposed to circulate the low-pressure refrigerant to the low-pressure heat exchanger by a jet flow of refrigerant injected from the nozzle.

14. The vapor compression refrigerant cycle according to claim 12, wherein the decompression device is a variable throttle having an opening degree that is controlled based on a temperature of the high pressure refrigerant.

15. The vapor compression refrigerant cycle according to claim 12, wherein the refrigerant discharged from the compressor has a pressure equal to or higher than critical pressure of the refrigerant.

* * * * *